US010174616B2

(12) United States Patent
Abreu et al.

(10) Patent No.: US 10,174,616 B2
(45) Date of Patent: Jan. 8, 2019

(54) TENSIONABLE CABLE ANCHOR ASSEMBLY AND A TENSIONING DEVICE FOR TENSIONING SAME

(71) Applicant: NCM INNOVATIONS (PTY) LTD., Johannesburg (ZA)

(72) Inventors: Rual Abreu, Johannesburg (ZA); Martin Cawood, Johannesburg (ZA); Brendan Robert Crompton, Johannesburg (ZA)

(73) Assignee: NCM INNOVATIONS (PTY) LTD., Johannesburg (ZA)

( * ) Notice: Subject to any disclaimer, the term of this patent is extended or adjusted under 35 U.S.C. 154(b) by 0 days.

(21) Appl. No.: 15/551,970

(22) PCT Filed: Aug. 3, 2015

(86) PCT No.: PCT/ZA2015/000052
§ 371 (c)(1),
(2) Date: Aug. 18, 2017

(87) PCT Pub. No.: WO2016/134386
PCT Pub. Date: Aug. 25, 2016

(65) Prior Publication Data
US 2018/0030832 A1    Feb. 1, 2018

(30) Foreign Application Priority Data

Feb. 18, 2015  (ZA) ................................ 2015/01099
Apr. 7, 2015   (ZA) ................................ 2015/02480

(51) Int. Cl.
*E21D 20/02*    (2006.01)
*E21D 21/00*    (2006.01)
*F16G 11/04*    (2006.01)

(52) U.S. Cl.
CPC .......... *E21D 21/008* (2013.01); *E21D 20/026* (2013.01); *E21D 21/006* (2016.01); *F16G 11/04* (2013.01)

(58) Field of Classification Search
CPC ..... E21D 21/006; E21D 1/008; E21D 20/026; F16G 11/04
See application file for complete search history.

(56) References Cited

U.S. PATENT DOCUMENTS 3,227,031 A * 1/1966 Williams ................ E04C 5/122
                                                411/26
3,693,359 A * 9/1972 Karara ................... E21D 21/008
                                                405/259.3
(Continued)

OTHER PUBLICATIONS

International Search Report, PCT/ZA2015/000052, dated May 11, 2016.

*Primary Examiner* — Benjamin F Fiorello
(74) *Attorney, Agent, or Firm* — Young & Thompson

(57) ABSTRACT

Disclosed is a cable anchor assembly including: a cable anchor body longitudinally extending between leading and trailing ends; a tensioning device with an outer member having first and second ends and a threaded through passage between the ends and an inner member which threadedly engages the threaded passage of the outer member and fixedly attached to the cable anchor body at or towards the trailing end; a faceplate engaging the cable anchor body between the leading end and the tensioning device. In use, with the cable anchor body inserted in a borehole and anchored therein, the faceplate positioned against a rock face and the first end of the outer member abutting the faceplate, the outer member is rotatable relative to the inner member, causing the inner member to move within the passage towards the second end of the outer member, drawing on the cable anchor body, tensioning the body.

15 Claims, 8 Drawing Sheets

(56) References Cited

U.S. PATENT DOCUMENTS

| | | | | |
|---|---|---|---|---|
| 4,618,291 | A * | 10/1986 | Wright | B25B 13/065 |
| | | | | 405/259.2 |
| 5,259,703 | A * | 11/1993 | Gillespie | E21D 21/006 |
| | | | | 405/259.1 |
| 5,525,013 | A * | 6/1996 | Seegmiller | E21D 11/006 |
| | | | | 405/259.3 |
| 5,829,922 | A * | 11/1998 | Calandra, Jr. | E21D 21/008 |
| | | | | 405/302.2 |
| 6,270,290 | B1 * | 8/2001 | Stankus | E21D 20/025 |
| | | | | 405/259.1 |
| 6,273,646 | B1 * | 8/2001 | Shaw | E21D 20/028 |
| | | | | 405/259.1 |
| 6,626,610 | B1 * | 9/2003 | Seegmiller | E21D 21/008 |
| | | | | 173/176 |
| 7,625,155 | B1 | 12/2009 | McKinney | |
| 2004/0135422 | A1 * | 7/2004 | Wallstein | E21D 21/008 |
| | | | | 299/31 |
| 2008/0179575 | A1 | 7/2008 | Craig | |
| 2009/0180841 | A1 * | 7/2009 | Walker | E21D 21/008 |
| | | | | 405/302.1 |
| 2009/0317197 | A1 | 12/2009 | Hinton | |
| 2011/0299940 | A1 * | 12/2011 | Earl, Jr. | E21D 21/0026 |
| | | | | 405/259.5 |

* cited by examiner

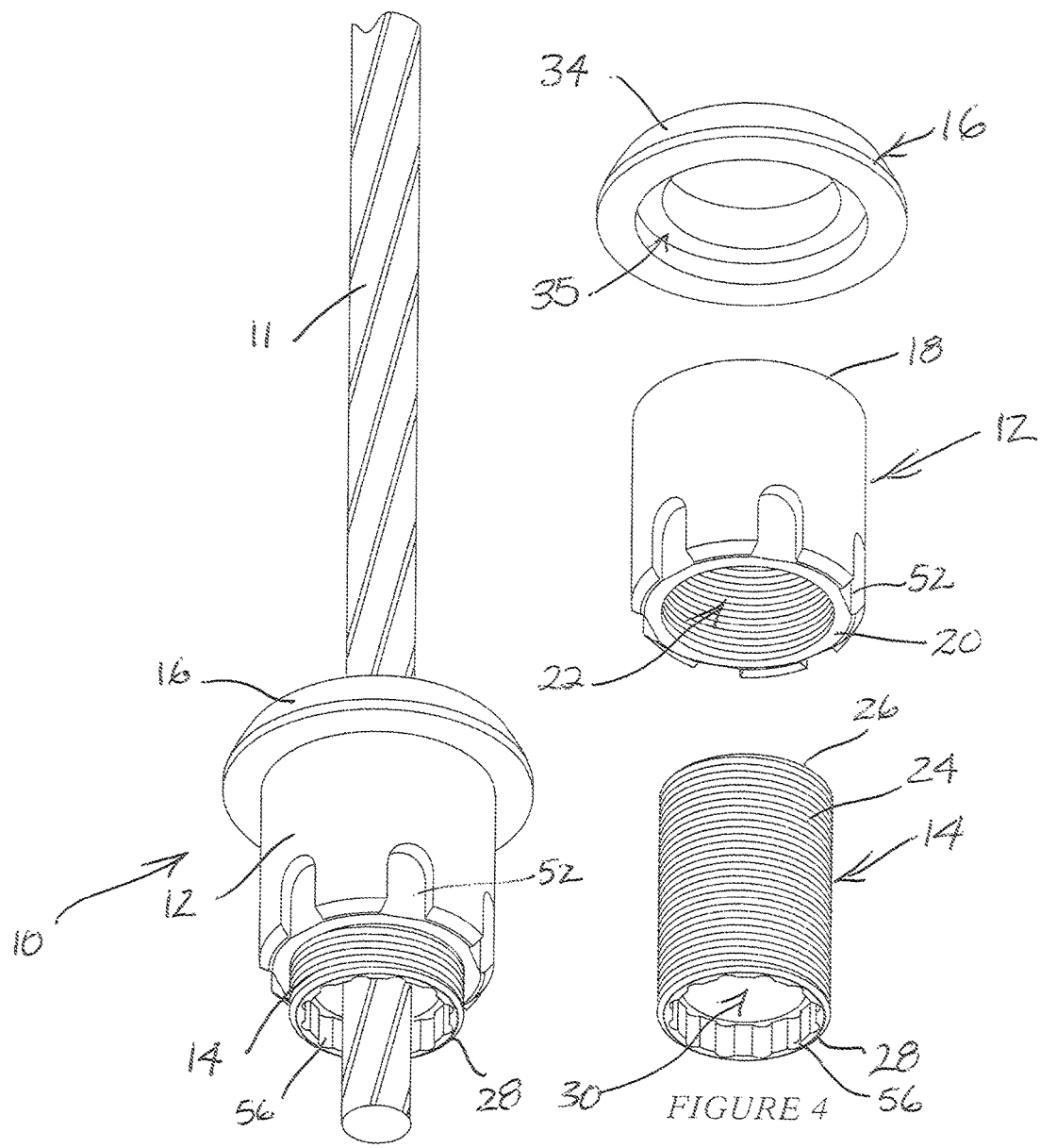

US 10,174,616 B2

TENSIONABLE CABLE ANCHOR ASSEMBLY AND A TENSIONING DEVICE FOR TENSIONING SAME

FIELD OF THE INVENTION

The invention relates to a tensionable cable anchor assembly and to a tensioning device for same. The tensionable cable anchor is suitable for use in mining and tunnelling to provide rock and wall support.

BACKGROUND OF THE INVENTION

A cable anchor is installed in a rock hole, by anchoring a distal end of the anchor within the hole. Then, to an end section protruding from the rock hole, a barrel and wedge assembly is attached or pre-attached. The cable anchor is then typically tensionably applying a tensioning force to this end section, to place the anchor body in pre-tension. Thereafter, the barrel is wedged against a faceplate to hold the body in pre-tension.

The distal end of the cable anchor can be mechanically anchored within the rock hole. Alternatively, the distal end can be anchored with a grout or resin.

The anchor process includes first inserting an adhesive containing capsule into the rock hole, followed by the cable anchor. Then, the cable is spun about its longitudinal axis, by engaging a suitably adapted drive means to a protruding or proximal end of the cable anchor. Once the capsule is torn to release its adhesive content, the drive means is removed and a tensioner attached. The tensioner tensions the cable anchor, now fixed in the rock hole by the hardened adhesive, and held in tension by the pre-attached barrel and wedge system. The tensioner is then detached and most of the end section of the anchor, which protrudes past the barrel and wedge, is cropped to prevent it from being safely taken off.

The process described above is disadvantageous in that a number of devices are used which have to be attached and removed from the cable anchor.

The disadvantage with this process is that, not only is the tensioning and cropping equipment is heavy and therefore difficult and cumbersome to elevate to the hanging wall of an excavation, where typically cable anchors are installed in a mining environment.

Also, it is difficult to have control over the length of cable anchor body that is cropped. The length of protruding cable is an important indication of proper cable installation.

To ensure that an installed cable anchor provides sufficient support to the rock mass within which it is installed, a predetermined length of the cable anchor must be inserted into the rock hole to extend, in tension, the length of the hole. If the hole is insufficiently deep, a cable anchor installed in this hole will have a longer protruding end section.

However, should a mine worker wish to cover up the fact that the rock hole is of insufficient depth, and the installed cable anchor of inadequate support, he merely has to crop the protruding end section after tensioning.

The invention at least partially solves the aforementioned problems.

SUMMARY OF INVENTION

In a first aspect, the invention provides a cable anchor assembly which includes:
a cable anchor body which longitudinally extends between a leading end and a trailing end;
a tensioning device which includes an outer member having a first end and a second end and a threaded passage which extends through the member between the ends and an inner member which threadedly engages with the threaded passage of the outer member and which is fixedly attached to the cable anchor body at or towards the trailing end;
a faceplate engaged with the cable anchor body between the leading end and the tensioning device;
wherein, in use, with the cable anchor body inserted in a borehole and anchored therein, the faceplate positioned against a rock face and the first end of the outer member abutting the faceplate, the outer member is rotatable relatively to the inner member to cause the inner member to move within the passage towards the second end of the outer member, drawing on the cable anchor body to place the body in tension.

The cable anchor body may be mechanically or adhesively anchored with the borehole.

To mechanically anchor the cable anchor body within the borehole, the cable anchor assembly may include a mechanical anchor engaged with the anchor body at or towards its leading end.

The outer member may have a barrel-like body.

The outer member may be domed at the first end to provide a spherical seat to the faceplate.

The outer member may be adapted to engage with a rotatable part of a torquing apparatus, such as, for example, a rotatable socket of a torque gun.

The inner member may have a cylindrical body which extends between a distal end and a proximal end.

The inner member may have a tapered bore which tapers towards the distal end and which is sized to receive the cable bolt.

The tensioning device may include a wedge element which is adapted for insertion in the bore of the inner member between the cable anchor body and a wall of the bore to wedge the cable anchor within the bore.

The inner member may be adapted to engage with a stationary part of the torquing apparatus, such as, for example, a stationary shaft of a torque gun.

The invention provides, in another aspect, a tensioning device for a cable anchor which includes an outer member having a first end, a second end and a threaded passage which extends through the member from the first end to the second end, and an inner member which is sized to fit within, and which threadedly engages with, the threaded passage of the outer member and which is adapted to fixedly attach to the anchor.

The outer member may have a barrel-like body.

The outer member may be domed at the first end to provide an abutment surface to an abutting faceplate.

At the second end, the outer member may be adapted to engage with a rotatable drive part of a torquing apparatus such as a torque gun.

The inner member may have a cylindrical body which extends between a distal end and a proximal end.

The inner member may have a tapered bore which tapers towards the distal end and which is sized to receive the cable anchor body.

The tensioning device may include a wedge element which is adapted to be received in the bore of the inner member.

In use of the tensioning device, when the cable anchor is received through the bore and the inner member is caused to move relatively to the outer member within the threaded passage towards the second end, the tapered bore is urged against the wedge element to wedge the cable anchor within the bore.

At the proximal end, the inner member may be adapted to engage with a stationary shaft of the torquing apparatus.

The tensioning device may include a locking means to lock the inner member to the outer member to ensure that the inner member and outer member rotate in unison. The locking means may be, for example, a shear pin or the like. When the shear pin breaks, the inner member or outer member can rotate independently of one another.

The invention extends to a method of tensioning a cable anchor within a rock hole, which cable anchor includes a cable anchor body which longitudinally extends between a leading end and a trailing end, a tensioning device which includes an outer member having a first end and a second end and a threaded passage which extends through the member between the ends and an inner member which threadedly engages with the threaded passage of the outer member and which is fixedly attached to the cable anchor body at or towards the trailing end, wherein the cable anchor is inserted into a rock hole and anchored within the hole, characterised in that the outer member is rotated relatively to the inner member, whilst retained in a constant position relatively to the rock hole, to cause the inner member to move within the threaded passage away from the rock hole thereby to place the bolt in tension.

The invention further provides a method of anchoring a cable anchor within a rock hole, which cable anchor includes a cable anchor body which longitudinally extends between a leading end and a trailing end, a tensioning device which includes an outer member having a first end and a second end and a threaded passage which extends through the member between the ends and an inner member which threadedly engages with the threaded passage of the outer member and which is fixedly attached to the cable anchor body at or towards the trailing end, the method including the steps of:

a) inserting the cable anchor into a predrilled rock hole, behind a capsule containing an adhesive material;
b) spinning the anchor, by actuating the inner member and the outer member of the tensioning assembly to rotate in unison, to break the capsule to release and mix the adhesive material and, once the adhesive material has hardened;
c) tensioning the anchor, by actuating the outer member to rotate relatively to the inner member to cause the inner member to move longitudinally relatively to the outer member.

Preferably, the inner member is engaged with the cable anchor body at the trailing end.

The inner member and the outer member may be caused to rotate in unison by preventing the inner member from moving relatively to the outer member.

Preventing movement of the inner member relatively to the outer member may be achieved by locking the inner member to the outer member.

The inner member and the outer member may be locked together by a locking means. The locking means may be, for example, a shear pin. When the shear pin breaks, the inner member or the outer member can rotate independently of the other member.

In step (b), the inner and outer members may rotate, in unison, in a first rotational direction.

In step (c), the outer member may rotate relatively to the inner member in the first rotational direction or in an opposed second rotational direction.

With the tensioning assembly being of the kind described above, the outer member may be rotated, independently, in the second rotational direction.

BRIEF DESCRIPTION OF THE DRAWINGS

The invention is described with reference to the following drawings in which:

FIG. 3 illustrates, in perspective, the tensioning device and cable bolt of FIG. 1;

FIG. 4 is an exploded view of the components of the tensioning device of FIG. 1;

DESCRIPTION OF PREFERRED EMBODIMENTS

Figure 1:
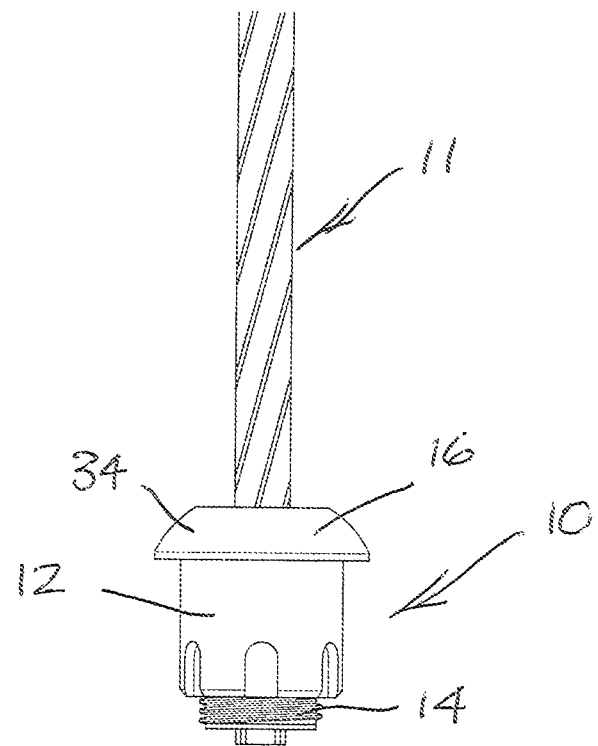
FIG. 1 is a view in elevation of a tensioning device in a cable anchor assembly in accordance with a first embodiment of the invention.

With reference to FIGS. 1 to 6, a tensioning device 10 in a cable anchor assembly according to a first embodiment of the invention, is described for use with a cable bolt 11 for supporting walls of a mining excavation or the like. The device 10 is configured for use with the cable bolt 11, which bolt typically comprises a plurality of helically wound high tensile steel wire strands providing a flexible cable bolt body.

With particular reference to FIG. 4, the tensioning device 10 includes an outer barrel-like nut 12, an inner barrel 14 and a washer 16. The nut 12 has a first end 18 and an opposed second end 20 and a threaded passage 22 which extends between the ends.

Figure 2:
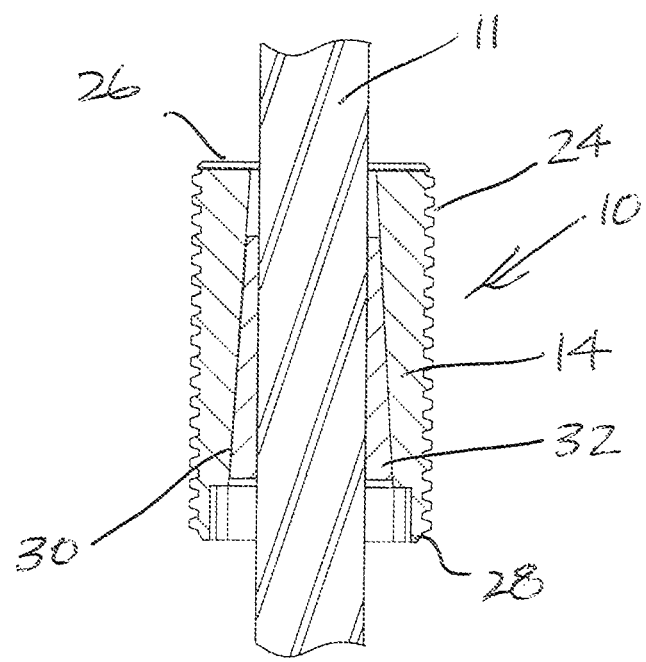
FIG. 2 illustrates, in longitudinal section, an inner component of the tensioning device of FIG. 1.

The inner barrel 14 is cylindrically shaped and complementary sized to locate within the passage 22 in use. The outer surface 24 of the barrel 14 is threaded to engage with the complementary threads of the passage 22. The barrel 14 has a leading end 26 and an opposed trailing end 28. Between these ends, a bore 30 extends which, as illustrated in FIG. 2, tapers towards the leading end.

The tensioning device 10 also includes a truncated conical wedge element 32 which tapers in a corresponding manner to the taper of the inner barrel bore 30. Thus, in use, the wedge element 32 fits within the bore about the cable bolt 28 as illustrated in FIG. 2.

The washer 16 provides a leading end spherical seat 34 which is presented to, and abuts, a faceplate 36 when in use. The washer 16 further prevents the tensioning device 10 from pulling through a hole in an associated faceplate when in use. Opposed to the spherical seat 34, the washer 16 is concave, providing a recess 35 for receipt of the first end 18 of the outer nut 12. For ease of explanation, the washer 16 is not illustrated in subsequent Figures nor described hereafter.

Figure 6A:
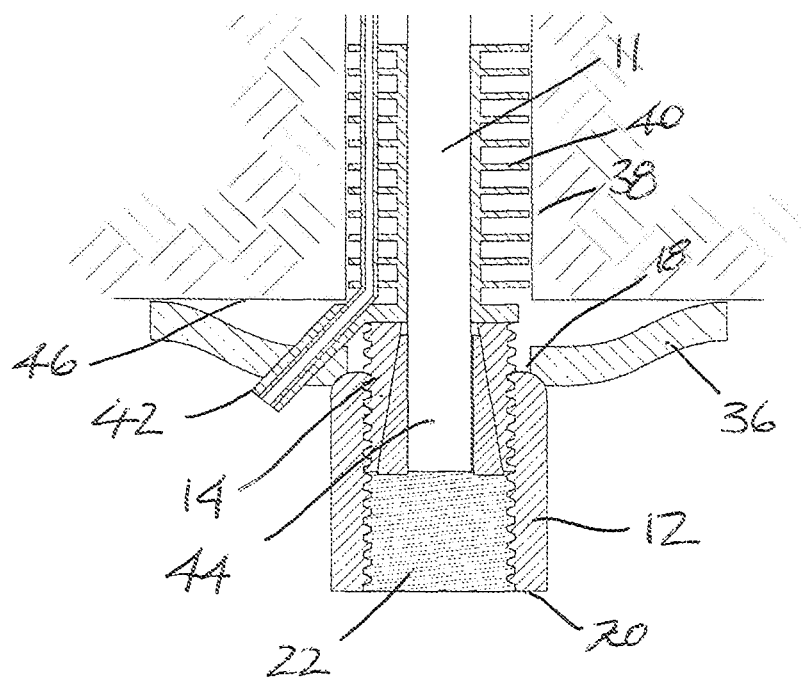
FIGS. 6A and 6B illustrate, in longitudinal section, the tensioning device of FIG. 1 engaged with the cable bolt which is inserted into a rock hole, before activation and in an activated tensioning state respectively.
Figure 6B:
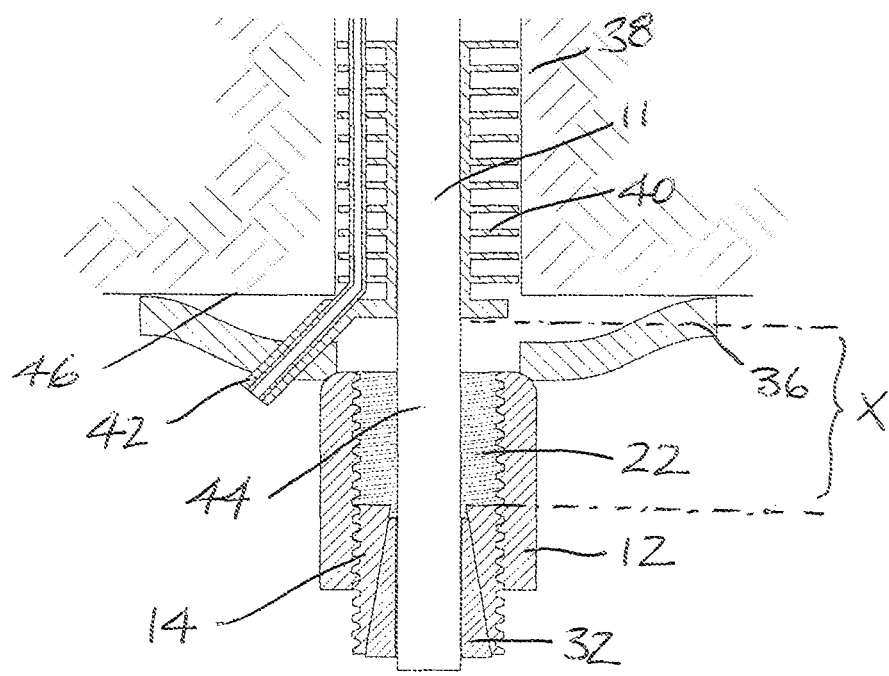
Figure 7:
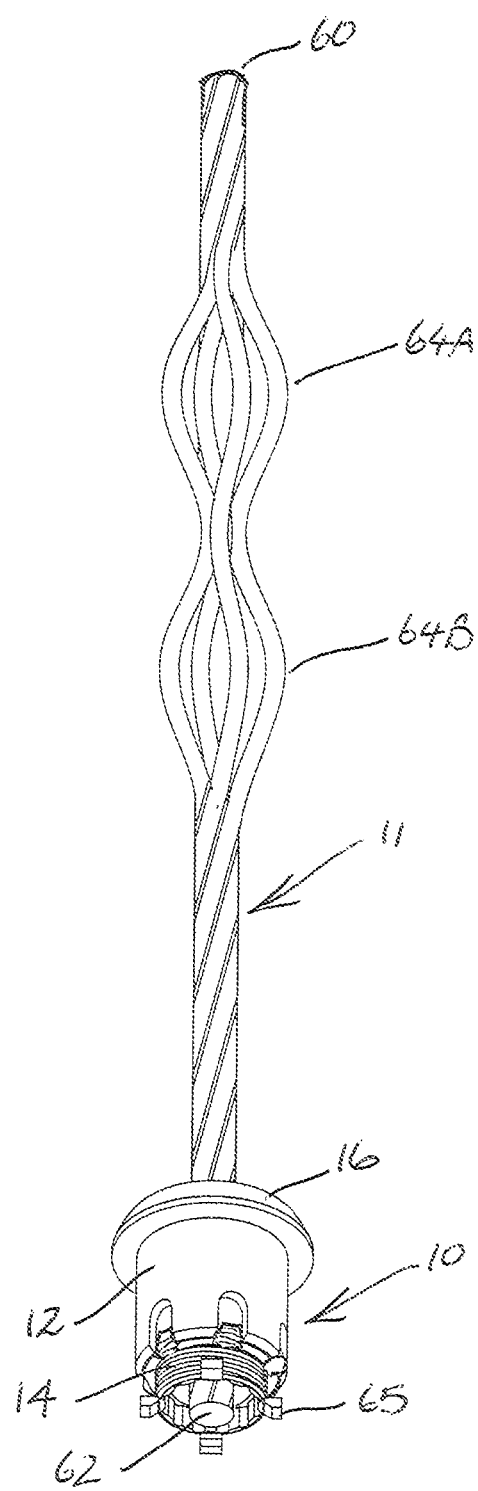
FIG. 7 is a view in perspective of a cable anchor and tensioning device assembly for use in a method of the invention.

In tensioning a cable bolt 11 within a predrilled rock hole 38, as illustrated in FIGS. 6A and 6B, the cable bolt 11 must be fixed within the rock hole 38 by any suitable means which is not shown in these figures. Often this is achieved mechanically with the bolt 11 having a mechanical anchor that is engaged with the bolt at one end and which is actuatable to fix the cable to the walls of the rock hole.

Alternatively, the bolt 11 can be adhesively anchored within the rock hole 38 in a method described below. In a grouted or adhesively anchored application, a resiliently deformable bung 40 is often associated with the cable bolt 11, engaged with the bolt 11 in a pre-assembly ahead of the tensioning device 10. When the bolt 11 is inserted in the rock hole 38, the bung 40 is at least partially inserted to seal a mouth of the rock hole from egress of a grout or adhesive material that is introduced through a conduit 42 in the bung 40.

The cable bolt 11 and tensioning device 10 pre-assembly is assembled by locating the faceplate 36 on the bolt 11, behind the bung 40, on a trailing end portion 44 of the bolt, followed by the washer 16. The inner barrel 14 trails the washer 16, passed over the trailing end 44 of the bolt 11. The wedge element 32 then is inserted into the tapered bore 30, between the bore 30 and the bolt 11, to wedge the barrel 14 to the bolt 11. Finally, the nut 12 is threadedly engaged with the barrel 14 by threadedly receiving the barrel within the passage 22.

When the pre-assembly is inserted in the rock hole 38, the faceplate 36 abuts a rock face 46, with the tensioning device 10 accessible to an operator, projecting from the hole 38 attached to the trailing end portion 44 of the bolt 11.

Figure 5:
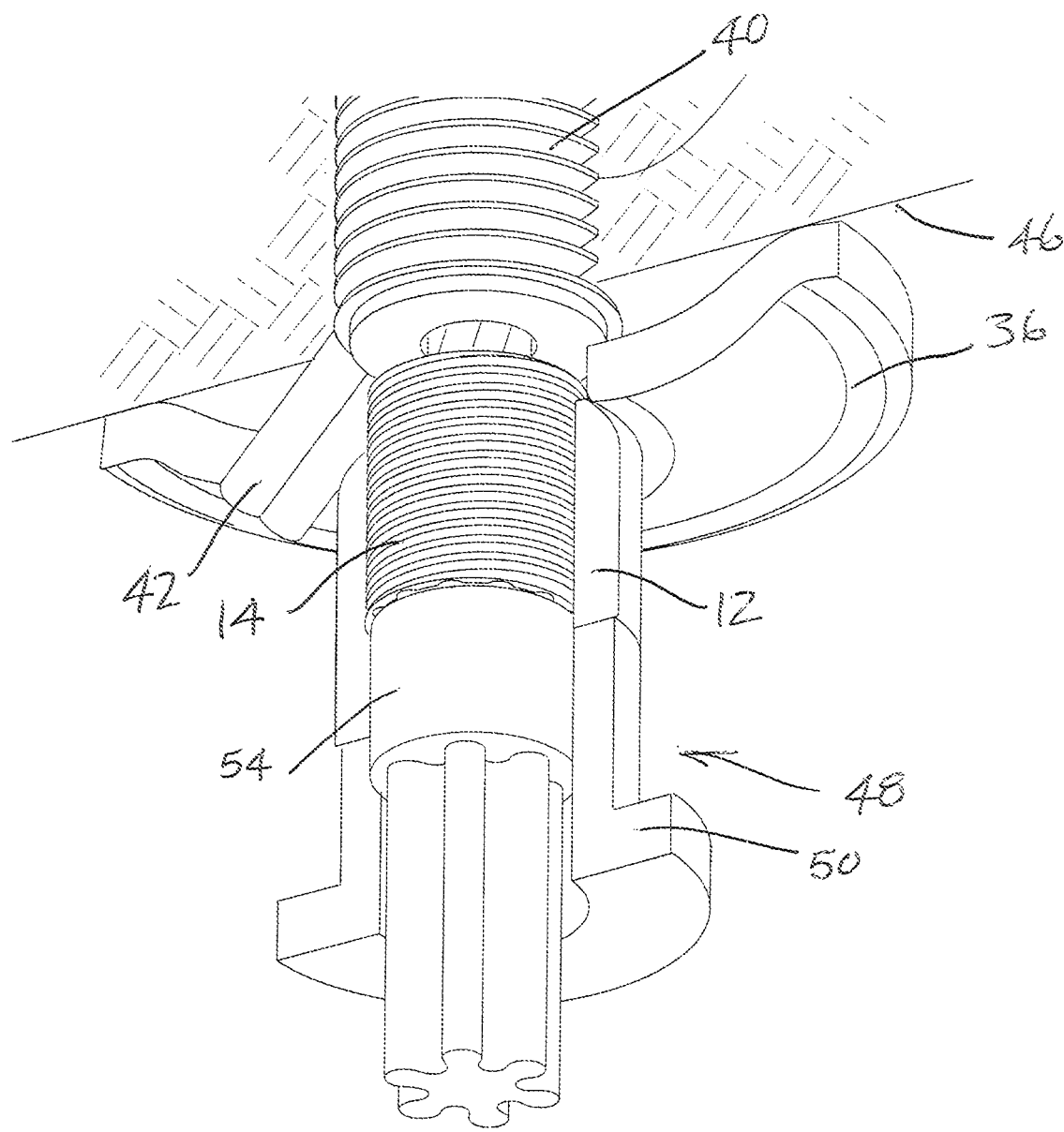
FIG. 5 illustrates, in perspective, a partially sectioned tensioning device in use engaged with actuating components of a torque gun.

A specially adapted torque gun is used to actuate the tensioning device 10 to tension the cable bolt 11 between an inner anchor point or location, within the rock hole 38 and an outer anchor point, which is defined at the point at which the inner barrel 14 attaches to the bolt 11. The gun can be driven hydraulically, pneumatically, mechanically, electronically and can be designed to be driven by, for example, a rock drill. Only the connecting parts 48 of the gun that engage with the tensioning device 10 are illustrated in FIG. 5.

The connecting part 48 includes an outer rotating socket 50 which engages with the outer nut 12 at its first end 18. The first end is adapted on an outer surface with a plurality of recessed formations 52 to which the socket 50 engages, each radially spaced from the others. In this example, the recessed formations are arched but they can be of any suitable shape, for example, hex-shaped. This feature is illustrated in FIGS. 3 and 4. An inner locking shaft 54 of the gun engages the inner barrel 14 at its trailing end 28 to hold the barrel stationary to reciprocate against the torque imparted on the outer nut as more fully described below. At the trailing end, the barrel 14 is formed with a plurality of recessed concave formations 56 on an inner surface leading to the bore 30 to which the shaft 54 engages.

Actuating the gun causes the socket 50 to rotate imparting torque on the outer nut 12. As the nut abuts the faceplate 36, as illustrated in FIGS. 6A and 6B, it rotates without moving in a direction axial to the axis of the cable bolt 11. However, within the outer nut, the inner barrel 14, which is prevented from rotating with the nut by the locking shaft 54 (which, whilst preventing rotation, is able to slide freely up and down in the axial direction to compensate for an activation stroke to be described below), moves relatively to the nut as a consequence, threadedly drawn through the passage 22 from the first end 18 towards the second end 20. This action is illustrated in FIGS. 6A and 6B. By this action, the barrel 14 pulls the end of the bolt 11 to which it is attached, axially outwardly of the hole 38 to tension the bolt 11 between this outer attachment point and the inner attachment point. In a counteractive force, the bolt 11 pulls on the wedge element 32 enhancing the wedging action.

The degree to which the cable bolt 11 is placed in tension in this manner can be represented by the distance the inner barrel 14 travels from a starting point, at the head of the nut 12, as illustrated in FIG. 6A, to an end point, projecting and trailing from the nut 12 at the opposed end as illustrated in FIG. 6B. This activation distance, or stroke, is designated X on FIG. 6B.

As a matter of practicality, the locking interface of the locking shaft 54 can be designed to allow the gun to couple and then hang from the tensioning device 10 during tightening to free the operator's hands.

The tensioning device 10 as part of the cable anchor assembly described above, can be used in a method of anchoring the cable anchor within a rock hole 38. This method is now described with reference to FIGS. 7 to 10.

The cable anchor 11 has a flexible elongate body, comprising of a plurality of helically wound high tensile steel wires, which extends between a distal end 60 and an opposed proximal end 62.

The cable anchor 11 includes a plurality of paddle formations, respectively designated 64A and 64B, preferably positioned towards the distal end 60. These paddle formations are formed by bird caging sections of the cable anchor by teasing the wires from inter-wound engagement with one another to separate along these sections and bow outwardly to form "a bird cage". These paddle formations are there to enhance the mixing of an adhesive resin as will be more fully described below. However, these formations 64A and 64B do not limit the scope of the invention and are a preferable inclusion to the cable anchor 11.

At the proximal end 16, the tensioning device 10 is provided. The device is as described above. However, an addition to the inner barrel 14 is a plurality of radially spaced formations 65 which laterally project from the barrel 14 at its trailing end 28.

Figure 8A:
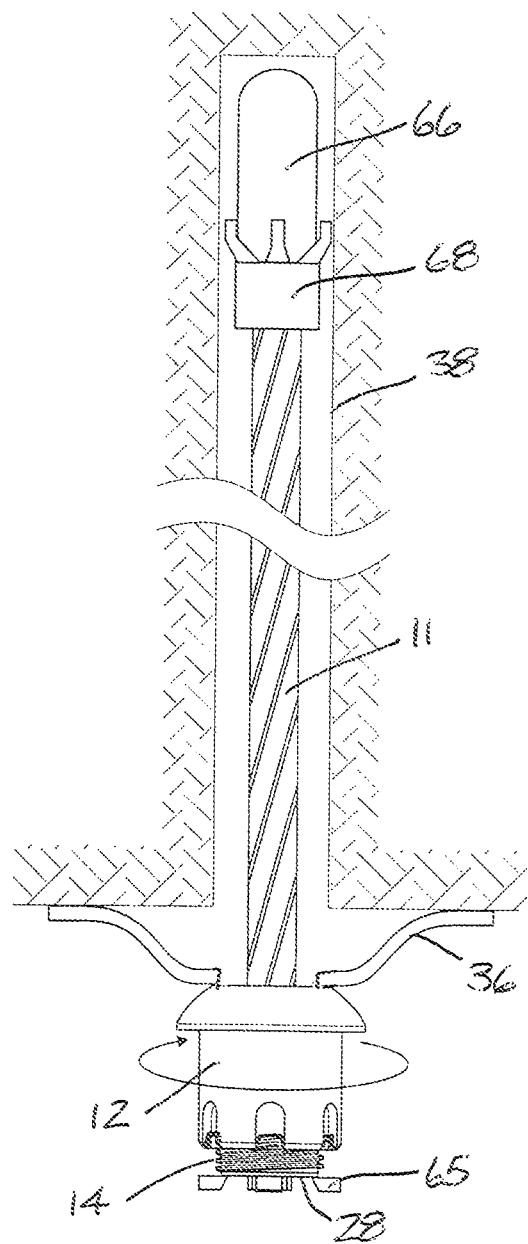
FIGS. 8A and 8B diagrammatically illustrate the cable anchor assembly of FIG. 7, inserted in a rock hole in a pre-tensioned state.

In use of the cable anchor 11 (the paddle formations 18 not shown for simplicity of illustration) in accordance with a first step of this method as illustrated in FIG. 8A, a capsule 66, having a wall of a frangible material, containing an adhesive material 71, is inserted into a predrilled rock anchor hole 38, in advance of the anchor bolt 11. The anchor bolt, optionally, has a retaining formation 68 formed and attached to its distal end 60. This retaining formation 68 engages with the resin containing capsule and assists in retaining the capsule position within the hole once the cable anchor 11 is inserted behind the capsule 66 into the rock hole 38.

After the bolt 11 is inserted, the outer nut 12 of the tensioning device 10 is rotated in a first rotational direction, as indicated by a directional arrow in FIG. 8A by engaging the rotation chuck of the torque gun (not shown), to move downwardly towards the proximal end 62 of the anchor body, over the inner barrel 14. This action is not torque inducing, with no consequent rotation of the inner barrel 14 or the anchor bolt 11. This is a first pre-positioning step to interlock the outer nut 12 with the inner barrel as described below.

Figure 8B:
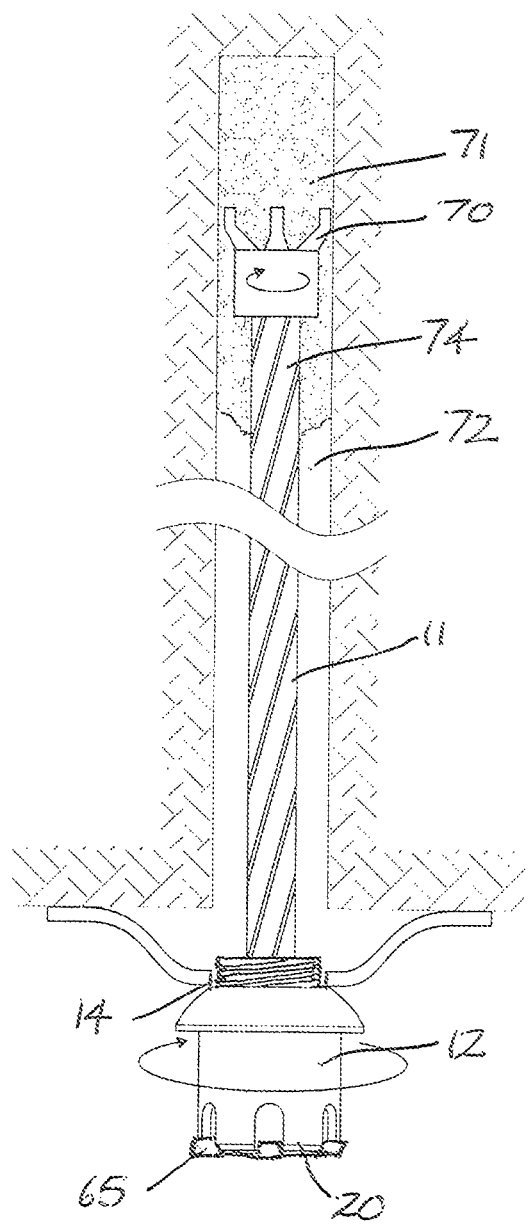
Figure 9:
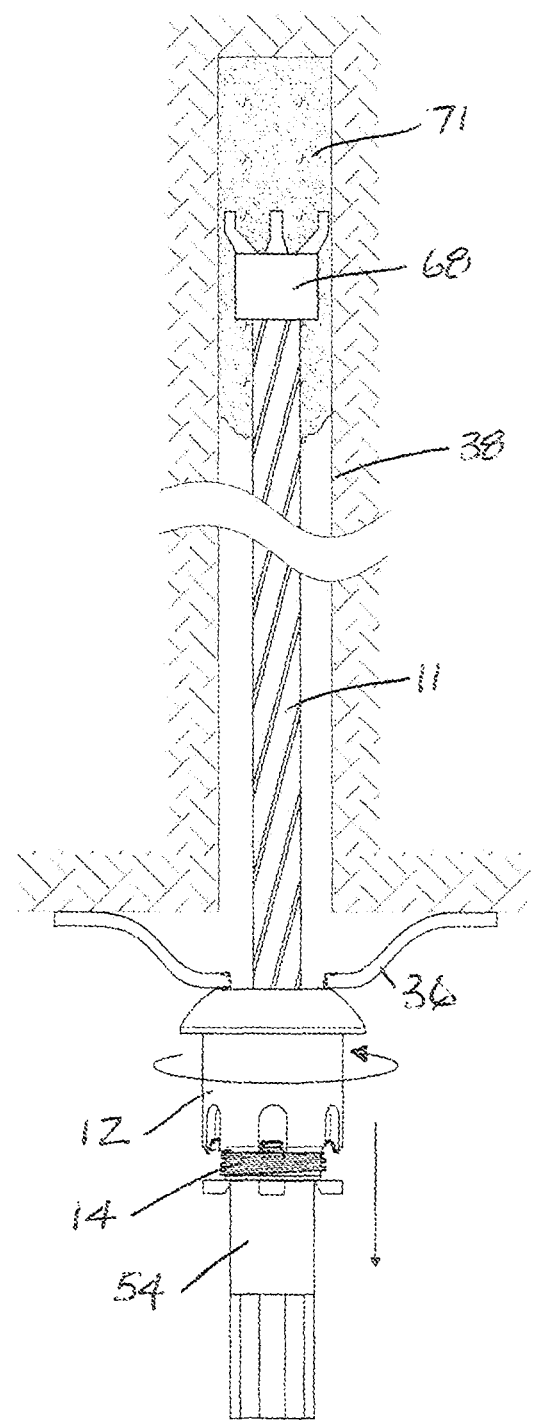
FIG. 9 diagrammatically illustrates the cable anchor of FIG. 7 in a tensioned state.

Once the second end 20 of the outer nut 12 reaches the trailing end 28 of the inner barrel 14 and engages with the formations 65 (as illustrated in FIG. 8B), the inner barrel 14 and the outer nut 12 are effectively interlocked to cause both these components of the tensioning device 10 to rotate in unison and, as the inner barrel 14 is fixed to the body of the cable anchor 11, also the cable anchor about its longitudinal axis.

This spinning causes fingers 70 of the retaining formation 46 to puncture and sever the walls of the resin capsule 66 to release the adhesive content 71 into the annular space 72 between the cable anchor 11 and the walls of the rock hole 38. Mixing of the adhesive content 71 is enhanced by the paddle formations 64A and 64B.

Once the adhesive material 71 hardens within at least a distal end section of the rock hole 38, at least an end section 74 of the cable anchor body 11 is fixed within the rock hole 38. Thereafter, further spinning of the anchor 11 is prevented.

At this point, the direction of rotation of the rotation socket (not shown in FIGS. 8 and 9 for ease of illustration) of the torque gun is reversed, and the outer nut 12 is caused to rotate in a second rotational direction (indicated with a directional arrow in FIG. 9) i.e. in the opposite direction. At the same time the locking shaft 54 of the torque gun engages with the inner barrel 14 to prevent the barrel 14 rotating.

With the inner barrel 14 prevented from rotating with the outer nut 12, and the outer nut 12 held in a fixed position relatively to the rock hole 38, abutting the faceplate 36, further rotational drive will cause the inner barrel to move relatively to the nut, drawn longitudinally outwardly (illustrated with a directional arrow on FIG. 9), pulling the cable anchor 11 with it and placing the anchor in tension.

Figures 10A, 10B:
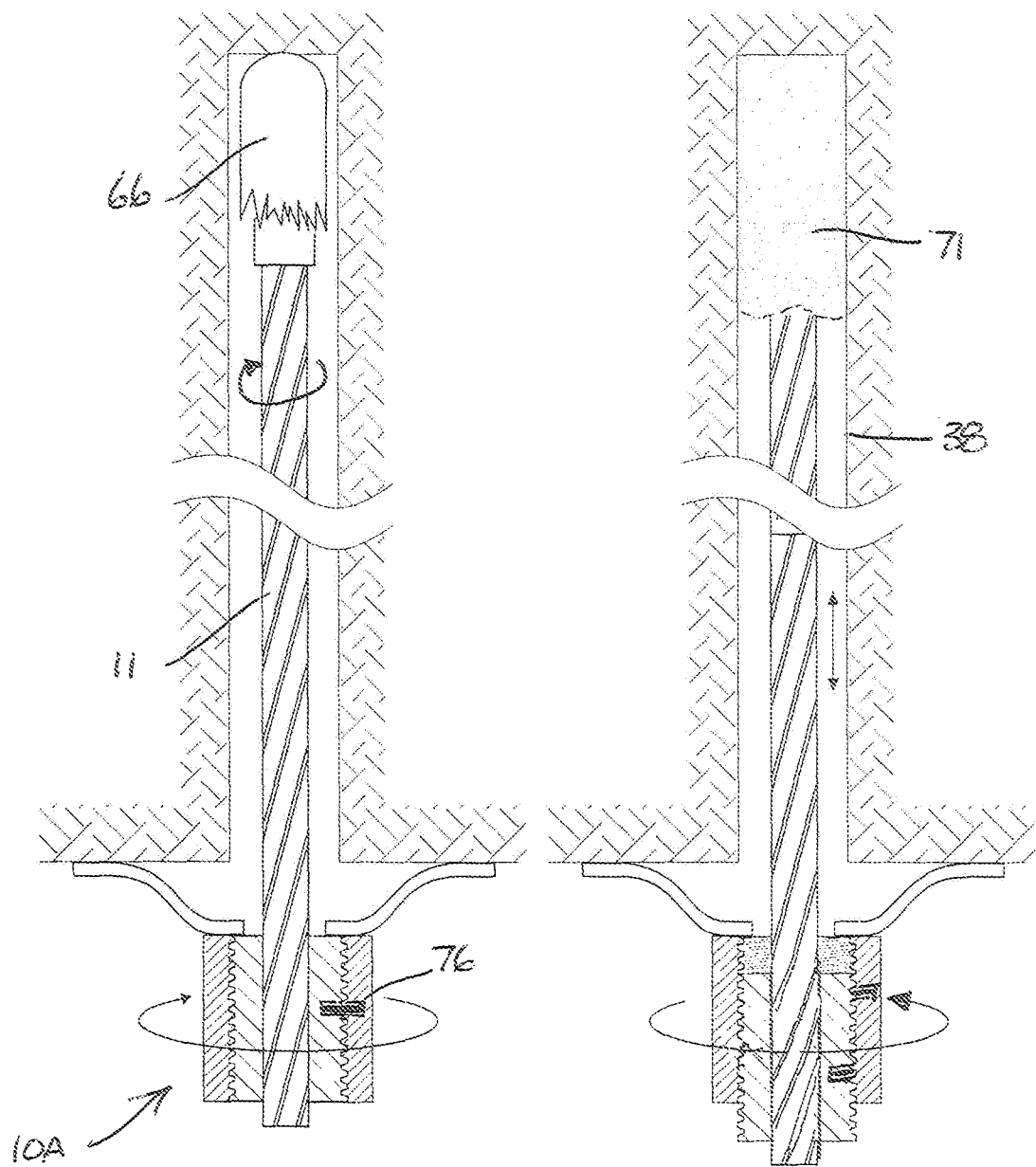
FIGS. 10A and 10B diagrammatically illustrate a cable anchor assembly in accordance with a second embodiment of the invention.

In a second embodiment of the invention, illustrated in FIGS. 10A and 10B, the tensioning device 10A includes a shear pin 76 which penetrates both the outer nut 12 and the inner barrel 14 to lock the outer nut to the inner barrel. The shear pin is analogous to the formations 65 in function.

Thus, when the torque gun is engage with device 10, the device and the cable anchor 11 rotate in unison, initially in the first rotational direction.

The spinning anchor 11 ruptures the resin capsule 66, releasing the adhesive content 71 which hardens, after mixing, and secures at least the end section 74 of the anchor in the rock hole, as illustrated in FIG. 10B.

With the anchor 11 now prevented from spinning, and with further application or rotational drive, either in the first or the second rotational direction, a load is imposed on the shear pin 76 which eventually causes the pin to break, unlocking the outer nut 12 from the inner barrel 14. Now with the inner barrel 14 prevented from rotating as described above, the outer nut can rotate, independently of the barrel, with the effect that the barrel 14 is pulled through the nut 12, as the nut 12 is held in position by interaction with the faceplate 36, in a longitudinal outward direction, placing the anchor 11 in tension (this tension is illustrated with a bidirectional arrow on FIG. 10B).

The invention claimed is:

1. A cable anchor assembly comprising:
   a cable anchor body which longitudinally extends between a leading end and a trailing end,
   a tensioning device, the tensioning device comprising:
      an outer member having a first end and a second end and a threaded passage which extends through the outer member between the first and second ends, the outer member being formed with a formation on an outer surface to engage a rotatable drive part of a torqueing apparatus, and
      an inner member that has a cylindrical body and that extends between a distal end and a proximal end, and a tapered bore which tapers towards the distal end and which threadedly engages with the threaded passage of the outer member and which is fixedly attached to the cable anchor body, which passes through the bore, at or towards the trailing end,
   a faceplate engaged with the cable anchor body between the leading end and the tensioning device,
   wherein, in use, with the cable anchor body inserted in a borehole and anchored therein, the faceplate positioned against a rock face and the first end of the outer member abutting the faceplate, the outer member is rotatable by the drive part, while the inner member is prevented from rotating by a stationary part of the torqueing apparatus, to cause the inner member to move within the passage towards the second end of the outer member, drawing on the cable anchor body to place the body in tension.

2. A cable anchor assembly according to claim 1 wherein the cable anchor body is mechanically or adhesively anchored within the borehole.

3. A cable anchor assembly according to claim 1 wherein the outer member has a barrel-like body.

4. A cable anchor assembly according to claim 1 wherein the outer member is domed at the first end to provide spherical seal to the faceplate.

5. A cable anchor assembly according to claim 1 wherein the tensioning device includes a wedge element which is adapted for insertion in the bore of the inner member between the cable anchor body and a wall of the bore.

6. A tensioning device for a cable anchor, the tensioning device comprising:
   an outer member having a first end, a second end and a threaded passage which extends through the member between the first end and the second end, and
   an inner member that has a cylindrical body which extends between a distal end and a proximal end which is sized to fit within, and which threadedly engages with, the threaded passage of the outer member and which has a tapered bore which tapers towards the distal end which has at least one formation on a wall of the bore adapted to engage a stationary shaft of a torqueing apparatus.

7. A tensioning device according to claim 6 wherein the outer member has a barrel-like body.

8. A tensioning device according to claim 6 wherein the outer member is domed at the first end to provide an abutment surface to an abutting faceplate.

9. A tensioning device according to claim 6 wherein the tensioning device includes a wedge element which is adapted to be received in the bore of the inner member.

10. A tensioning device according to claim 6 wherein the outer member, at the second end, is formed with a formation on an outer surface to engage with a rotatable socket of a torqueing apparatus.

11. A tensioning device according to claim 6 wherein the tensioning device includes a locking means to lock the inner member to the outer member to ensure that the inner member and outer member rotate in unison.

12. A tensioning device according to claim 11 wherein the locking means is a shear pin.

13. A method of tensioning a cable anchor within a rock hole, wherein the cable anchor comprises:

a cable anchor body which longitudinally extends between a leading end and a trailing end, a tensioning device which includes an outer member having a first end and a second end and a threaded passage which extends through the member between the ends and an inner member which threadedly engages with the threaded passage of the outer member and which is fixedly attached to the cable anchor body at or towards the trailing end, the method comprising:

inserting the cable anchor into a predrilled rock hole, behind a capsule containing an adhesive material;

spinning the anchor, by engaging a rotating socket of a torqueing apparatus to the outer member of the tensioning assembly and actuating the torqueing apparatus to cause the inner and outer members to rotate in unison, to break the capsule to release and mix the adhesive material and, once the adhesive material has hardened;

tensioning the anchor, by engaging a locking shaft of the torqueing apparatus while the rotating socket is still engaged with the outer member and actuating the torqueing apparatus to rotate the outer member, while the inner member is prevented from rotating by the locking shaft, to the inner member to cause the inner member to move longitudinally relatively to the outer member.

14. A method according to claim 13 wherein, during said spinning, the inner and outer members rotate, in unison, in a first rotational direction.

15. A method according to claim 14 wherein during said tensioning, the outer member rotates relatively to the inner member in the first rotational direction or in an opposed second rotational direction.

* * * * *